(12) United States Patent
Iseman

(10) Patent No.: US 12,486,031 B2
(45) Date of Patent: Dec. 2, 2025

(54) ATMOSPHERIC DELIVERY OF PARTICULATE MATTER

(71) Applicant: Make Sunsets Incorporated, Box Elder, SD (US)

(72) Inventor: Luke Iseman, Box Elder, SD (US)

(73) Assignee: Make Sunsets Incorporated, Box Elder, SD (US)

( * ) Notice: Subject to any disclaimer, the term of this patent is extended or adjusted under 35 U.S.C. 154(b) by 342 days.

(21) Appl. No.: 18/127,917

(22) Filed: Mar. 29, 2023

(65) Prior Publication Data

US 2024/0326997 A1    Oct. 3, 2024

(51) Int. Cl.
  *B64D 1/18*    (2006.01)
  *B64B 1/40*    (2006.01)
  *B64B 1/68*    (2006.01)

(52) U.S. Cl.
  CPC ............ *B64D 1/18* (2013.01); *B64B 1/40* (2013.01); *B64B 1/68* (2013.01)

(58) Field of Classification Search
  CPC ............... B64D 1/18; B64B 1/40; B64B 1/68
  USPC ......................................................... 239/2.1
  See application file for complete search history.

(56) References Cited

U.S. PATENT DOCUMENTS

| | | | | |
|---|---|---|---|---|
| 3,489,072 A | * | 1/1970 | Secor ................ | E04H 12/28 126/312 |
| 4,029,273 A | * | 6/1977 | Christoffel, Jr. ..... | A63H 27/085 244/153 R |
| 5,003,186 A | * | 3/1991 | Chang ................ | A01G 15/00 250/503.1 |
| 5,878,355 A | | 3/1999 | Berg et al. | |
| 2010/0071771 A1 | | 3/2010 | Chan et al. | |
| 2020/0316628 A1 | | 10/2020 | Odinokov et al. | |
| 2021/0176925 A1 | | 6/2021 | DeFelice et al. | |

OTHER PUBLICATIONS

International Search Report and Written Opinion of International Search Authority in International Application No. PCT/US2024/011803, mailed on Jun. 10, 2024.
Laakso, Anton, et al. "Radiative and climate effects of stratospheric sulfur geoengineering using seasonally varying injection areas." Atmospheric Chemistry and Physics 17.11 (2017): 6957-6974.

\* cited by examiner

*Primary Examiner* — Chee-Chong Lee
(74) *Attorney, Agent, or Firm* — Cognition IP, P.C.; Edward Steakley; Justin White

(57) ABSTRACT

A system configured to disperse particulate matter can include a container, an elevation subsystem, and a dispersal subsystem. The container can hold and dispense a pressurized liquid and can be refilled with new pressurized liquid. The elevation subsystem can elevate and lower the container between a ground level location and a raised location in the atmosphere. The dispersal subsystem can be coupled to the container, receive the pressurized liquid therefrom, convert the pressurized liquid into a gas, and disperse the gas into the atmosphere at the raised location. The gas can be configured to react with the atmosphere to result in the suspension of particulate matter within the atmosphere. The pressurized liquid can be sulfur dioxide, the particulate matter can include sulfates, the raised location can be within the stratosphere or higher, and the system can be transferred between and operable with multiple separate ground based stations.

19 Claims, 6 Drawing Sheets

```
300 ─┐
      ┌─────────┐
      │  START  │─── 302
      └────┬────┘
           ▼
  ┌──────────────────┐
  │ PROVIDE PRESSURIZED │╌╌ 304
  │   LIQUID WITHIN    │
  │     CONTAINER      │
  └─────────┬──────────┘
            ▼
  ┌──────────────────┐
  │ ELEVATE CONTAINER │── 306
  │  TO RAISE LOCATION│
  │   IN ATMOSPHERE   │
  └─────────┬─────────┘
            ▼
  ┌──────────────────┐
  │ RECEIVE PRESSURIZED│── 308
  │ LIQUID INTO DISPERSAL│
  │      SUBSYSTEM     │
  └─────────┬──────────┘
            ▼
  ┌──────────────────┐
  │  CONVERT LIQUID INTO│── 310
  │  GAS IN DISPERSAL  │
  │     SUBSYSTEM      │
  └─────────┬──────────┘
            ▼
  ┌──────────────────┐
  │  DISPERSE GAS INTO │── 312
  │   ATMOSPHERE AT    │
  │   RAISED LOCATION  │
  └─────────┬──────────┘
            ▼
       ┌────────┐
       │  END   │── 314
       └────────┘
```

FIG. 3

ATMOSPHERIC DELIVERY OF PARTICULATE MATTER

TECHNICAL FIELD

The present disclosure relates generally to particulate suspension within air, and more particularly to the dispersal of particulate matter into the atmosphere at high altitudes.

BACKGROUND

Global warming and climate change are a growing issue that affects the entire planet. Many factors contribute to climate change, and a variety of things have been done and still can be done to offset the negative effects of climate change. Traditional offset efforts have included, for example, reducing carbon outputs, taking measures to absorb carbon from the environment, such as reforestation and conservation, converting waste into energy, and cooling the earth by reducing at least some amounts of sunlight and radiation that reach the surface of the earth. Reducing radiation from the sun can include reflecting back sunlight, such as by dispersing particulate matter into the atmosphere.

Unfortunately, little research and progress has been made to date in the way of dispersing particulate matter into the atmosphere to reflect back at least some sunlight. Concerns over viability and overall safety have hampered some efforts in this field, and many current techniques and proposals have been limited regarding controlled dispersion and large scale use.

Although traditional ways of countering the negative effects of global warming and climate change have had some impact in the past, improvements are always helpful. In particular, what is desired are improved ways of dispersing particulate matter at high altitudes to counter some of the negative effects of global warming and climate change.

SUMMARY

It is an advantage of the present disclosure to provide improved ways of dispersing particulate matter at high altitudes to counter some of the negative effects of global warming and climate change. The disclosed features, apparatuses, systems, and methods relate to the delivery of particulate matter within air. In particular, the disclosed apparatuses, systems, and methods involve the dispersal of particulate matter into the atmosphere at high altitudes and in ways that can be controlled and administered on a large scale basis.

In various embodiments of the present disclosure, a system configured to disperse particulate matter can include a container, an elevation subsystem, and a dispersal subsystem. The container can be configured to hold a pressurized liquid therein, to dispense the pressurized liquid, and to be refilled with new pressurized liquid. The elevation subsystem can be configured to elevate and lower the container between a ground level location and a raised location in the atmosphere above the ground level location. The dispersal subsystem can be coupled to the container and can be configured to receive the pressurized liquid therefrom. The dispersal subsystem can be further configured to convert the pressurized liquid into a gas and to disperse the gas into the atmosphere at the raised location. The gas can be configured to react with the atmosphere to result in the suspension of particulate matter within the atmosphere.

In various detailed embodiments, the pressurized liquid can be sulfur dioxide and the particulate matter can include sulfates. The raised location in the atmosphere can be within the stratosphere or higher. Also, the system can be configured to be transferred between and operable with multiple separate ground based stations at different ground based locations. In some arrangements, the container can have a volume of about 2-4 cubic feet. The container can be insulated and can further include a container heater configured to heat the container to a preferred temperature and a container temperature sensor configured to monitor the temperature of the container and to facilitate operation of the container heater.

In further detailed embodiments, the elevation subsystem can include a balloon, a tether, a lift gas supply subsystem, a telemetry antenna, and a steering subsystem. The balloon can be configured to be filled with a lift gas. The tether can be coupled to the balloon, can be configured to control elevation of the balloon, and can be further configured to facilitate the filling and emptying of lift gas from the balloon. The lift gas supply subsystem can be configured to supply lift gas into the balloon. The telemetry antenna can be coupled to the tether at a known location and can be configured to detect the elevation of the balloon. The steering subsystem can be configured to control the direction of travel of the balloon. The lift gas supply subsystem can include a valve and a pump arranged to control the filling and emptying of lift gas to the balloon. In some arrangements, the elevation subsystem can also include a ballast coupled to the tether at a location lower than the telemetry antenna. The ballast can include a cargo tank, can be buoyant in water, and can float in water when the balloon is sufficiently lowered.

In still further detailed embodiments, the dispersal subsystem can include a first pressure regulator, a conversion chamber, a second pressure regulator, and a nozzle. The first pressure regulator can be coupled to an outlet of the container, can be configured to receive the pressurized liquid from the container, and can be configured to provide the pressurized liquid at an outlet at a first controlled pressure and flow rate. The conversion chamber can be coupled to the outlet of the first pressure regulator and can be configured to facilitate transforming the pressurized liquid into a pressurized gas. The second pressure regulator can be coupled to an outlet of the conversion chamber and can be configured to receive the pressurized gas from the conversion chamber and provide the pressurized gas at an outlet at a second controlled pressure and flow rate. The nozzle can be coupled to the outlet of the second pressure regulator and can be configured to disperse the gas into the atmosphere at the raised location at the second controlled pressure and flow rate. In some arrangements, the dispersal subsystem can further include a first pressure sensor at the first pressure regulator, first control circuitry configured to control the first controlled pressure and flow rate of the first pressure regulator based on output of the first pressure sensor, a second pressure sensor at the second pressure regulator, and second control circuitry configured to control the second controlled pressure and flow rate of the second pressure regulator based on output of the second pressure sensor. The dispersal subsystem can further include a conversion chamber heater configured to heat the conversion chamber, and a conversion chamber temperature sensor configured to monitor the temperature of the conversion chamber and to facilitate operation of the conversion chamber heater. The dispersal subsystem can further include a nozzle heater configured to heat the nozzle, and a nozzle temperature sensor configured to monitor the temperature of the nozzle and to facilitate operation of the nozzle heater. In some arrangements, the dispersal subsystem can further include an optical sensor located proximate the nozzle and configured to detect residual matter on the nozzle, and a cleaning element located proximate the nozzle and configured to clean the nozzle when the optical sensor detects residual matter on the nozzle.

In various further embodiments of the present disclosure, methods of delivering particulate matter into the atmosphere are provided. Pertinent process steps can include providing a pressurized liquid within a container coupled to a dispersal subsystem, elevating the container and dispersal subsystem to a raised location in the atmosphere above a ground level location, receiving the pressurized liquid from the container into the dispersal subsystem while the container and dispersal subsystem are at the raised location, converting the pressurized liquid into a gas within the dispersal subsystem, and dispersing the gas from the dispersal subsystem into the atmosphere at the raised location. The gas can be configured to react with the atmosphere to result in the suspension of particulate matter within the atmosphere.

In various detailed embodiments, the pressurized liquid can be sulfur dioxide and the particulate matter can include sulfates. Elevating the container and dispersal subsystem can involve coupling the container and dispersal subsystem to a balloon and filling the balloon with a lift gas. Converting the pressurized liquid into a gas can involve regulating the pressurized liquid into a conversion chamber, heating the pressurized liquid in the conversion chamber until it becomes a gas, and regulating the gas out of the conversion chamber. In various arrangements, additional process steps can include steering the container and dispersal subsystem while elevating to the raised location, as well as lowering the container from the raised location to a lowered location, refilling the container with a new pressurized liquid, and repeating the steps of elevating, receiving, converting, and dispersing with the new pressurized liquid.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, and methods for the atmospheric delivery of particulate matter at high altitudes. These drawings in no way limit any changes in form and detail that may be made to the disclosure by one skilled in the art without departing from the spirit and scope of the disclosure.

FIG. 3 illustrates a flowchart of an example summary method of delivering particulate matter into the atmosphere according to one embodiment of the present disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods providing improved ways of dispersing particulate matter at high altitudes to counter some of the negative effects of global warming and climate change. In particular, the disclosed apparatuses, systems, and methods involve the dispersal of particulate matter into the atmosphere at high altitudes and in ways that can be controlled and administered on a large scale basis. This can generally be done by, for example, elevating a pressurized liquid in a container to an altitude within the stratosphere or higher, converting the pressurized liquid into a gas, and dispersing the gas within the atmosphere. The gas can be configured to react with the atmosphere to result in the suspension of particulate matter within the atmosphere.

Although various embodiments disclosed herein discuss the use of sulfur dioxide as the pressurized liquid such that the particulate matter includes sulfates, it will be readily appreciated that the disclosed features, apparatuses, systems, and methods can similarly be with any suitable substitute or alternative liquids, gases, or other materials that take advantage of the disclosed features. Similarly, while dispersal can be in the stratosphere, it will be understood that other elevations, locations, and techniques can also be applicable. Other applications, arrangements, and extrapolations beyond the illustrated embodiments are also contemplated.

Figure 1:
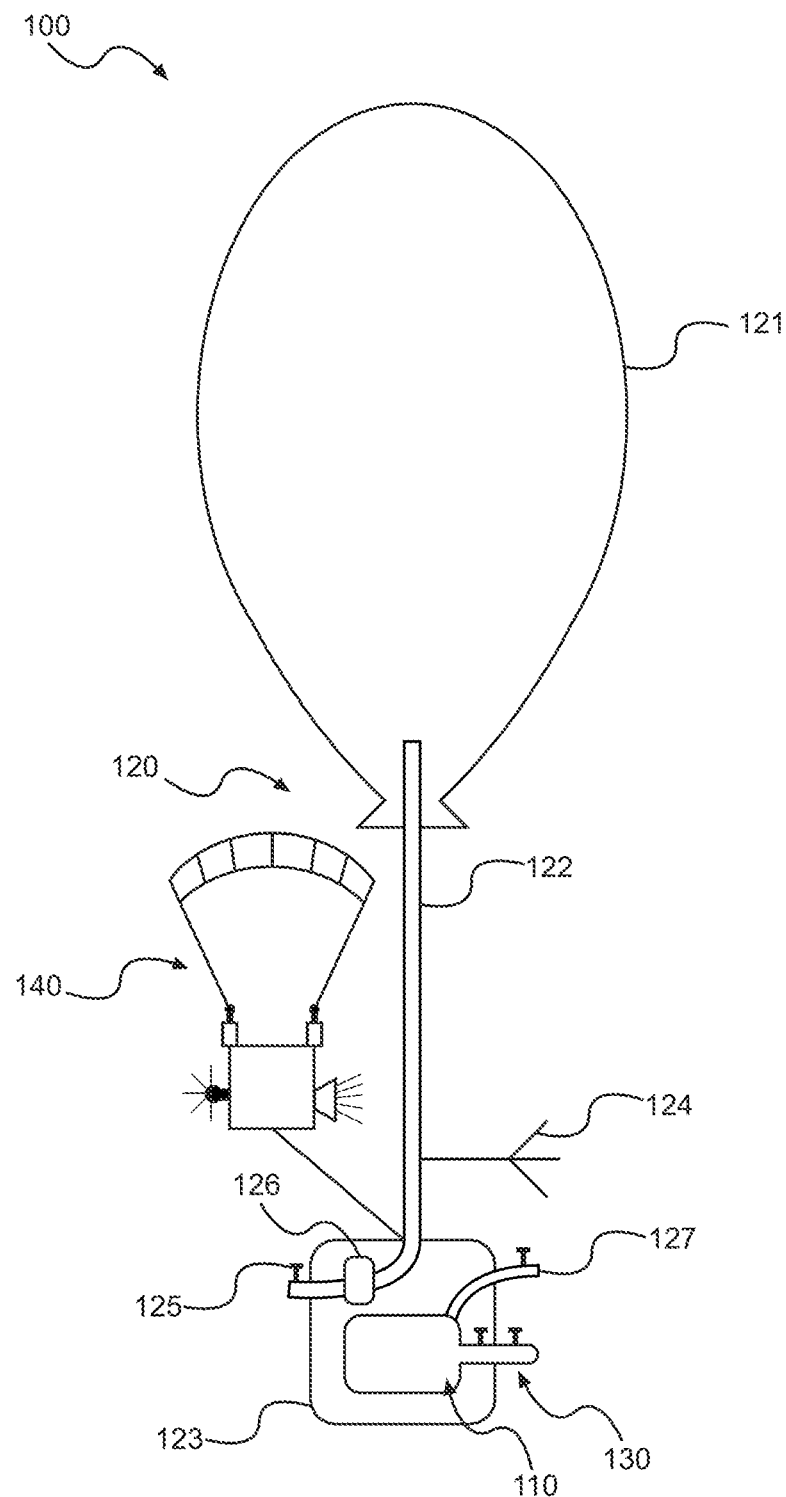
FIG. 1 illustrates a schematic diagram of an example particulate matter dispersal system according to one embodiment of the present disclosure.

Referring first to FIG. 1, a schematic diagram of an example particulate matter dispersal system is illustrated. Particulate matter dispersal system 100 can generally include a container 110, an elevation subsystem 120, and a dispersal subsystem 130, among other possible components and subsystems. Container 110 can be configured to hold a pressurized liquid therein, and can also be configured to dispense the pressurized liquid and to be refilled with new pressurized liquid. Elevation subsystem 120 can be configured to elevate and lower the container between a ground level location and a raised location in the atmosphere above the ground level location. Dispersal subsystem 130 can be coupled to container 110 and can be configured to receive the pressurized liquid from the container, to convert the pressurized liquid into a gas, and to disperse the gas into the atmosphere at the raised location, as set forth in greater detail below. The dispersed gas can be configured to react with the atmosphere to result in the suspension of particulate matter within the atmosphere.

In various arrangements, the pressurized liquid can include sulfur dioxide, the particulate matter can include sulfates, and the raised location can be within the stratosphere or higher. Other liquids, particulate matters, and raised locations are also possible. In some arrangements, particulate matter dispersal system 100 including a single container 110, a single elevation subsystem 120, and a single dispersal subsystem 130 can be an entire self-contained particulate matter dispersal system. In other arrangements, system 100 can form one dispersal unit in a greater particulate matter dispersal system having multiple identical or substantially similar dispersal units, one or more ground level or lower level base stations, remotely controlled units and communication units, and the like, as set forth in greater detail below.

Elevation subsystem 120 can include any suitable way for elevating container 110 and dispersal subsystem 130. Although a balloon based elevation subsystem has been disclosed herein for purposes of illustration, it will be understood that the present disclosure is not limited to balloons and that other types of elevation subsystems can include the use of drones, rockets, airplanes, and other aircraft. In some arrangements, elevation subsystem 120 can include a balloon 121 that can be configured to be filled with a lift gas, such as hydrogen, helium, hot air, or any other suitable lift gas. Tether 122 can be configured to control elevation of balloon 121, and as such can couple the balloon to ballast 123. In some arrangements, tether 122 can also be configured to facilitate the filling and emptying of lift gas from the balloon 121, and as such can form a tube for this purpose. Ballast 123 can be buoyant in water and can be figured to hold or otherwise support container 110 and dispersal subsystem 130, further details of which are provided below.

Telemetry antenna 124 can be mounted or otherwise coupled to tether 122 or any other suitable component of overall system 100 at a known location, and this telemetry antenna can be configured to detect and facilitate communication regarding the elevation and location of balloon 121 and the overall system. A lift gas supply subsystem configured to supply lift gas into balloon 121 can include a valve and pump arrangement 125 to control the intake and release of the lift gas as well as an optional fuel cell, battery, and/or engine 126. An optional cargo tank and supply line 127 can also be included in ballast 123 in some arrangements. Lift gas can be input into balloon 121 from an outside source through valve and pump arrangement 125 when the balloon is at a ground level or other low elevation location. When lowering of balloon 121 is desired, lift gas can be released into fuel cell 126 and/or out of overall system 100 by way of valve and pump arrangement 125 to reduce buoyancy until the overall system is heavier than air but the balloon and tether combination remains buoyant in air. Ballast 123 can then arrive at ground level and/or float on water until a sufficient amount of lift gas is refilled into balloon 121 for another use cycle of the overall system.

In some arrangements, a steering subsystem 140 can be configured to control a direction of travel of balloon 121 and overall system 100 during ascent and/or descent of the balloon. Steering subsystem 140, further details of which are provided below, can be considered as part of elevation subsystem 130 or can be its own independent subsystem in some arrangements. Steering subsystem 140 can be coupled to ballast 123, balloon 121, or any other suitable component of overall system 100 at an appropriate stable location to facilitate steering of the overall system rather than allow the lateral movements of the balloon and overall system be fully subjected to the unpredictable nature of wind and other environmental factors.

Figure 2:
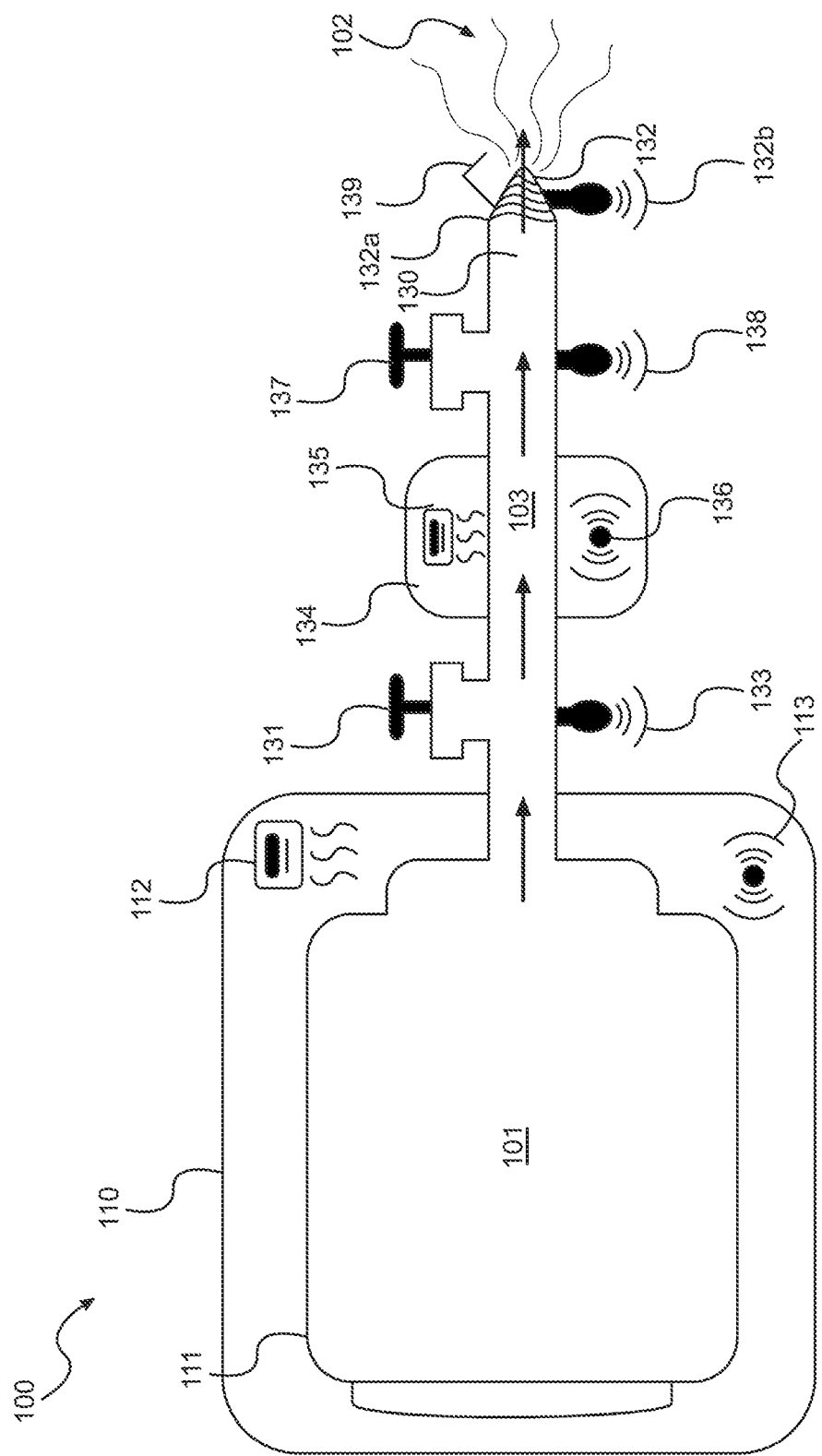
FIG. 2 illustrates a schematic diagram of an example container and an example dispersal subsystem for a particulate matter dispersal system according to one embodiment of the present disclosure.

Moving next to FIG. 2, a schematic diagram of an example container and dispersal subsystem for a particulate matter dispersal system is provided. Container 110 can include an internal tank 111 configured to be filled with, hold, expel, and be refilled with a pressurized liquid 101, such as sulfur dioxide, for example. Container 110 can have an internal volume of about 2-4 cubic feet in some arrangements, although lower or greater volumes are also possible. Container 110 can be thermally insulated in some cases and can include container heater 112 configured to heat the container and thus the contents within internal tank 111 to a preferred temperature, as well as container temperature sensor 113 configured to monitor the temperature of the container and to facilitate operation of the container heater. Container 110 can also have suitable control circuitry, processor(s), and other electronic components to facilitate automated functionalities of container heater 112 and container temperature sensor 113, as will be readily appreciated by those of skill in the art.

In various basic embodiments, dispersal subsystem 130 can include at least a first pressure regulator 131 and a nozzle 132, which together can be sufficient to convert pressurized liquid 101 inside container 110 into gas 102 dispersed into the atmosphere outside overall system 100 in some situations. First pressure regulator 131 can be an electronically controlled pressure regulator coupled to an outlet of container 110 and can be configured to receive pressurized liquid 101 from the container and provide the pressurized liquid at a first regulator outlet at a first controlled pressure and flow rate. In basic embodiments, first pressure regulator 131 and nozzle 132 can be configured to convert the pressurized liquid into a gas for dispersal. Nozzle 132 can be coupled directly or indirectly to the first regulator outlet and can be configured to disperse the gas into the atmosphere at a raised location. Nozzle 132 can disperse the gas at a second controlled pressure and flow rate that can be different than the first controlled pressure and flow rate in some instances. Dispersal subsystem 130 can also include suitable control circuitry, processor(s), and other electronic components to facilitate automated functionalities of first pressure regulator 131 and nozzle 132, as will be readily appreciated. As such, dispersal subsystem 130 can also include a first temperature sensor 133 at the first pressure regulator 131 and first control circuitry configured to control the first controlled pressure and flow rate of the first pressure regulator based on output of the first temperature sensor.

In more robust embodiments, dispersal subsystem 130 can include additional features and components. Where first pressure regulator 131 is configured to expel pressurized liquid at its outlet, for example, conversion chamber 134 can be configured to facilitate transforming the pressurized liquid into a pressurized gas. Conversion chamber 134 can be coupled to an outlet of first pressure regulator 131 to receive pressurized liquid 101, and conversion chamber heater 135 can be configured to heat the conversion chamber to facilitate transforming the pressurized liquid into pressurized gas 103. Conversion chamber temperature sensor 136 can be configured to monitor the temperature inside conversion chamber 135. Suitable control circuitry, processor(s), and other electronic components can facilitate automated operations of conversion chamber 135 and conversion chamber temperature sensor 136, as will be readily appreciated. Dispersal subsystem 130 can also include second pressure regulator 137, which can be an electronically controlled pressure regulator coupled to an outlet of conversion chamber 135. Second pressure regulator 137 can be configured to receive pressurized gas 103 from conversion chamber 135 and provide the pressurized gas at a second pressure regulator outlet at a second controlled pressure and flow rate. As in the case of first pressure regulator 131, dispersal subsystem 130 can also include suitable control circuitry, processor(s), and other electronic components to facilitate automated functionalities of second pressure regulator 137, as will be readily appreciated. As such, dispersal subsystem 130 can also include second temperature sensor 138 at second pressure regulator 137 and second control circuitry configured to control the second controlled pressure and flow rate of the second pressure regulator based on output of the second temperature sensor.

Robust embodiments of dispersal subsystem 130 can include nozzle 132 as being coupled to the outlet of second pressure regulator 137. In such arrangements, nozzle 132 can be configured to receive pressurized gas 103 that has passed through second pressure regulator 137 at a second controlled pressure and flow rate, and then disperse gas 102 into the atmosphere at a raised location or elevation, which can be at the second controlled pressure and flow rate or a further modified pressure and flow rate. As noted above, dispersed gas 102 can be configured to react with the atmosphere to result in the suspension of particulate matter within the atmosphere. Dispersal subsystem 130 can also include nozzle heater 132a configured to heat nozzle 132, nozzle temperature sensor 132b configured to monitor the temperature of the nozzle, and suitable control circuitry, processor(s), and other electronic components to facilitate automated functionalities of the nozzle, nozzle heater, and nozzle temperature sensor, as will be readily appreciated. In some arrangements, dispersal subsystem 130 can also include a nozzle cleaning arrangement 139 to keep nozzle 132 clean during system operations. Such a nozzle cleaning arrangement 139 can include an optical sensor located proximate nozzle 132 and configured to detect residual matter on the nozzle, and also a cleaning element located proximate the nozzle and configured to clean the nozzle when the optical sensor detects residual matter on the nozzle. The cleaning element can be a wiper blade, for example. In various arrangements, the optical sensor can also function to monitor and facilitate control of gas dispersal from nozzle 132.

Transitioning now to FIG. 3, a flowchart of an example summary method 300 of delivering particulate matter into the atmosphere is provided. Summary method 300 can represent one possible overall method for delivering particulate matter, and it will be understood that various other steps, features, and details of such an overall method are not provided here for purposes of simplicity. After a start step 302, an optional first process step 304 can involve providing pressurized liquid within a container. The container can be coupled to a dispersal subsystem, both of which can be part of an overall system configured to disperse particulate matter. The pressurized liquid can be sulfur dioxide, for example, although other liquids can also be used. Process step 304 can be automatically performed in some arrangements, such as by a robotically controlled container filling process.

At a following process step 306, the container can be elevated to a raised location in the atmosphere. The raised location can be above a ground level location, and elevating the container can involve the use of an elevation subsystem as part of the overall system. The elevation subsystem can be balloon based, as detailed above, or can involve any other suitable form of elevating the container. Process step 306 can be automatically performed in some arrangements, such as by a robotically controlled container elevation process.

At the next process step 308, the pressurized liquid can be received into a dispersal subsystem. This can be done while the container and dispersal subsystem are at the raised location and can involve the use of a pressure regulator within the dispersal subsystem. Process step 308 can be automatically performed in some arrangements, such as by robotically controlling the start and flow of liquid from the container into the dispersal subsystem.

At subsequent process step 310, the liquid can be converted into a gas within the dispersal subsystem. This can involve the use of a conversion chamber within the dispersal subsystem, for example. Process step 310 can be automatically performed in some arrangements, such as by robotically controlling the conversion of liquid into a gas within a part of the dispersal subsystem.

At a following process step 312, the gas can be dispersed into the atmosphere at the raised location. This can involve the use of a nozzle within the dispersal subsystem, for example. The gas can be configured to react with the atmosphere to result in the suspension of particulate matter within the atmosphere. The particulate matter can include sulfates, for example, although other forms of particulate matter are also possible. Process step 312 can be automatically performed in some arrangements, such as by robotically controlling the start and flow of gas out from the dispersal subsystem into the atmosphere. The method can then end at end step 314.

For foregoing method 300, it will be appreciated that not all process steps are necessary, and that other process steps may be added in some arrangements. For example, a container with pressurized liquid may already be provided in some arrangements, while others may involve filling the container with the liquid. Furthermore, the order of steps may be altered in some cases, and some steps may be performed simultaneously. For example, steps 308-312 may be performed simultaneously in some cases. Although known process steps are provided for the various techniques in method 300, it will be appreciated that other suitable steps can be used for delivering particulate matter into the atmosphere. Other variations and extrapolations of the disclosed method will also be readily appreciated by those of skill in the art.

Figure 4:
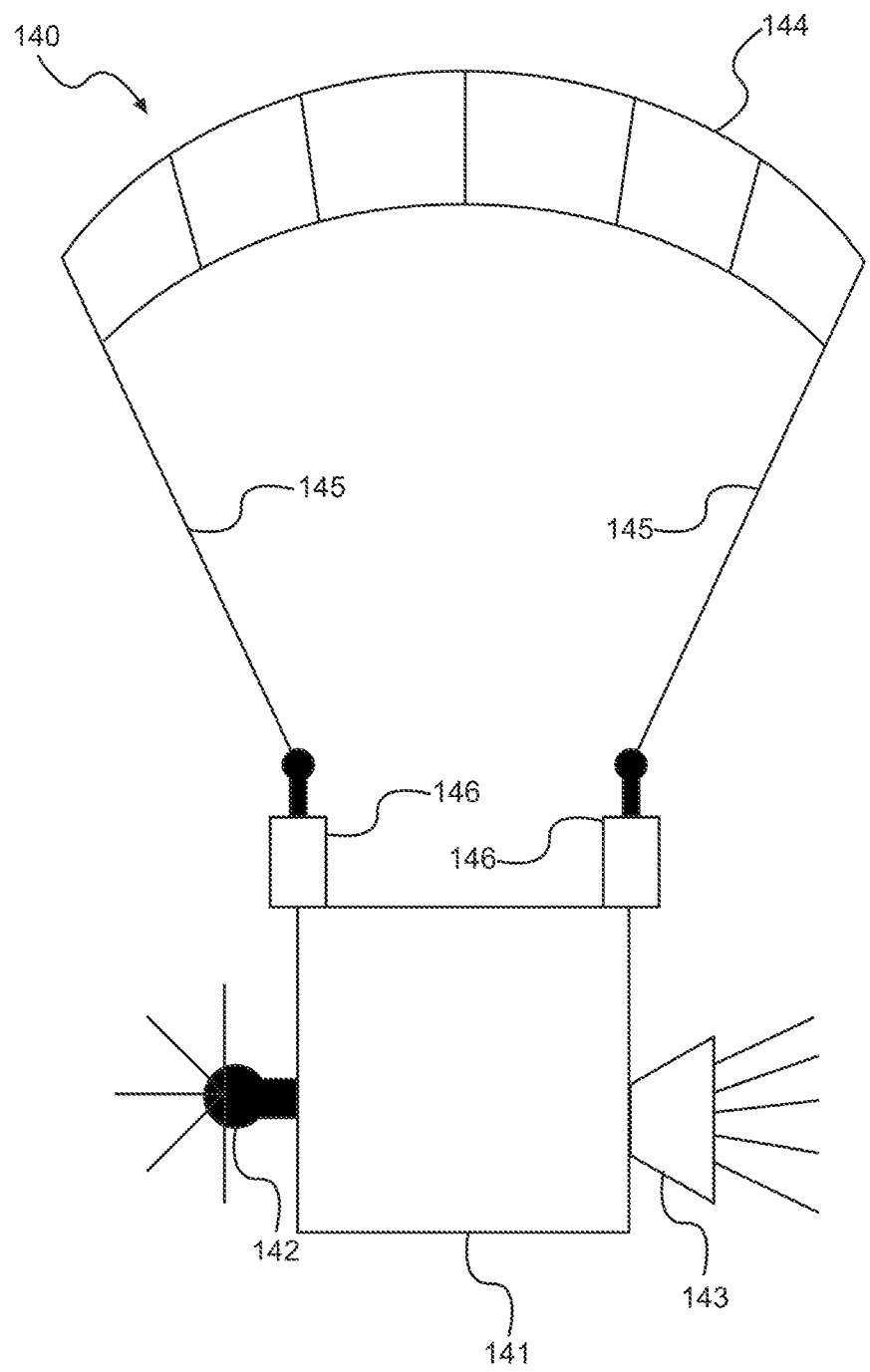
FIG. 4 illustrates a schematic diagram of an example steering subsystem for a particulate matter dispersal system according to one embodiment of the present disclosure.

FIG. 4 illustrates a schematic diagram of an example steering subsystem for a particulate matter dispersal system. As noted above, steering subsystem 140 can be configured to facilitate control of a lateral direction of travel for a particulate matter dispersal system or unit during its ascent and/or descent. Steering subsystem 140 can include steering ballast 141 that can be coupled to any suitable component of the overall system or unit (not shown), as well as one or more steering sensors 142 and one or more steering thrusters 143. Steering sensor(s) 142 can include a GPS unit, accelerometer, wind gauge, and/or other components configured to determine location, speed, acceleration, and environmental factors. Steering thruster(s) 143 can be powered by battery, other electricity, and/or hydrogen or other fuel and can be configured to push steering ballast 141 and the whole steering subsystem 140 in a desired lateral direction. Steering subsystem 140 can also have suitable control circuitry, processor(s), and other electronic components to facilitate automated functionalities of steering sensor(s) 142 and steering thruster(s) 143, as will be readily appreciated by those of skill in the art.

Steering subsystem 140 can additionally or alternatively include a steerable parachute 144 or suitable wind foil component having adjustable lines 145 that can be extended from and retracted into line receptacles 146. Servo motors or other suitable drive components can extend or retract different adjustable lines 145 from and into line receptacles 146 to configure the position and orientation of steerable parachute 144 or wind foil component to alter the direction of travel of steering ballast 141 and the whole steering subsystem 140. Data from steering sensor(s) 142 can be used to facilitate the extension and retraction of adjustable lines for this purpose. Steering subsystem 140 can also have suitable control circuitry, processor(s), and other electronic components to facilitate automated functionalities of steering sensor(s) 142 with the servo motors controlling the line lengths of adjustable lines 145, as will be readily appreciated by those of skill in the art.

Figure 5:
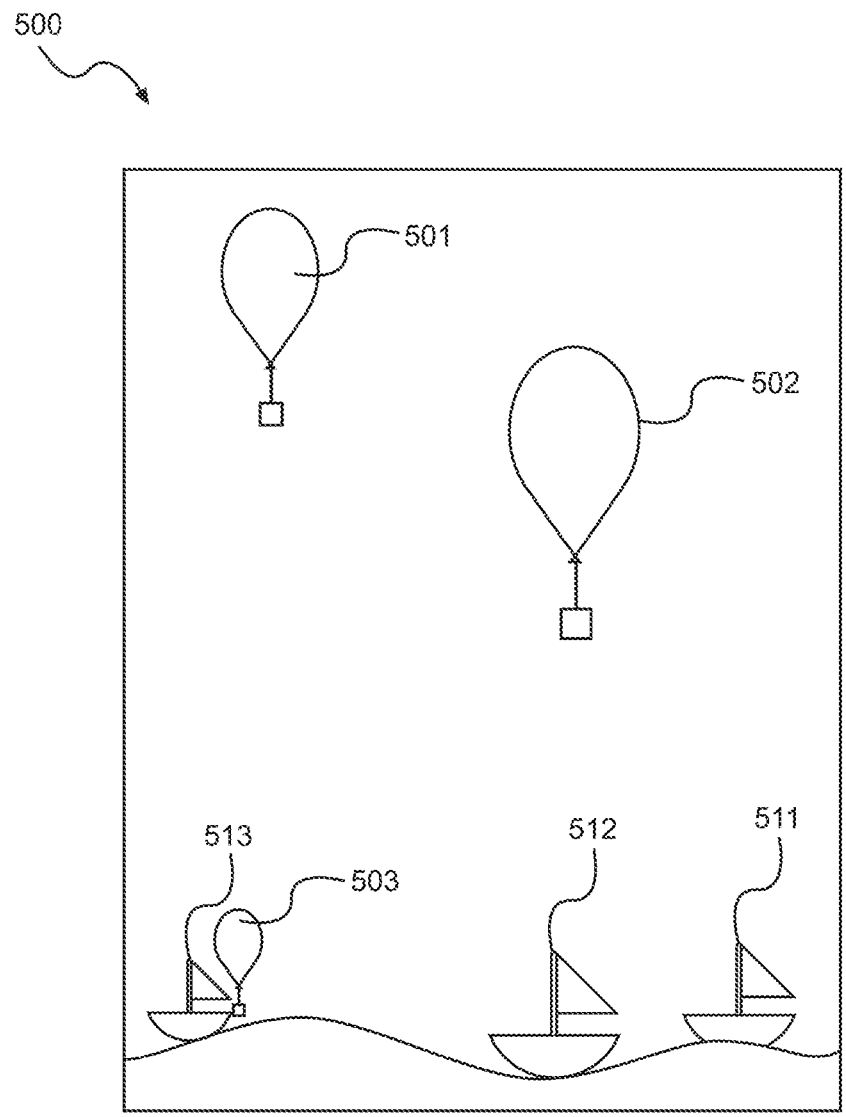
FIG. 5 illustrates a schematic diagram of an example particulate matter dispersal system having multiple dispersal units and multiple ground stations according to one embodiment of the present disclosure.

Continuing with FIG. 5, a schematic diagram of an example particulate matter dispersal system having multiple dispersal units and multiple ground stations is provided. Particulate matter dispersal system 500 can have multiple dispersal units 501, 502, 503 and multiple ground based stations 511, 512, 513 that are each configured for the docking of dispersal units. Each of dispersal units 501, 502, 503 can be identical or substantially similar to particulate matter dispersal system 100 set forth above, and each of these dispersal units (i.e., self-contained particulate matter dispersal systems) can be configured to be transferred between and operable with multiple separate ground based stations 511, 512, 513 at different ground based locations. Although ground based stations 511, 512, 513 are shown as being boats at "ground level" on the ocean at sea level or at other water locations, it will be understood that such ground based stations can be located on water and/or land at different locations as well. Furthermore, it will be understood that more than three dispersal units and/or ground based stations can be used in an overall particulate matter dispersal system 500.

In various embodiments, each dispersal unit 501, 502, 503 can be configured to be filled with pressurized fluid and lift gas at a ground based station 511, 512, or 513, elevated to a raised location in the atmosphere where gas can be dispersed therefrom, and lowered to the same or another ground based station to be refilled for further use cycles. Overall particulate matter dispersal system 500 can also include communication units at each dispersal unit and at each ground based station, so as to facilitate communications to determine desirable travel and docking possibilities for dispersal units in use. Separate communication towers or facilities and overall system coordination units can also be included within overall system 500. Each ground based station 511, 512, 513 can be configured to communicate its location, distance to dispersal units, availability, resources at hand, environmental variables, and/or other pertinent factors for determining which ground based station is preferable for a given dispersal unit to dock at next during ongoing cycles of use for a dispersal unit.

Figure 6:
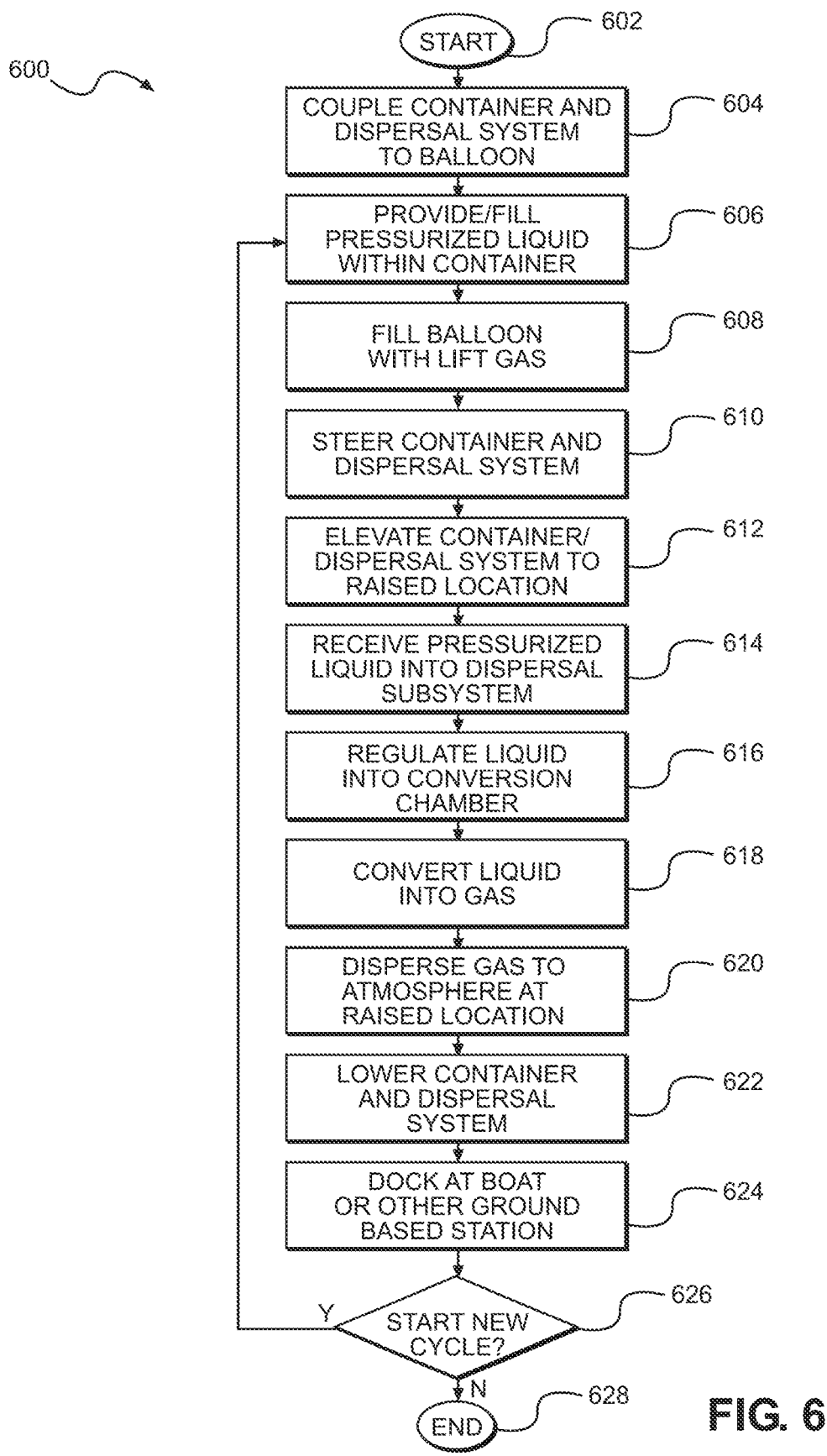
FIG. 6 illustrates a flowchart of an example detailed method of delivering particulate matter into the atmosphere according to one embodiment of the present disclosure.

Lastly, FIG. 6 illustrates a flowchart of an example detailed method of delivering particulate matter into the atmosphere. Detailed method 600 can represent one possible way of delivering particulate matter into the atmosphere, and it will be understood that various other steps, features, and details of such a detailed method are not provided here for purposes of simplicity. After a start step 602, a first process step 604 can involve coupling a container and dispersal subsystem to a balloon as part of an elevation subsystem. The container can be coupled to the dispersal subsystem, both of which can combine with the elevation subsystem to form an overall system configured to disperse particulate matter as detailed above.

A following process step 606 can involve providing pressurized liquid within the container. This can take place at a boat or other ground based station configured for filling containers. The pressurized liquid can be sulfur dioxide, for example, although other liquids can also be used. Process step 606 can be automatically performed in some arrangements, such as by a robotically controlled liquid into container filling process.

At the next process step 608, the balloon can be filled with a lift gas. This can also take place at the boat or other ground based station configured for filling balloons as well as containers. The lift gas can be hydrogen, helium, hot air, or any other suitable lift gas. Process step 608 can be automatically performed in some arrangements, such as by a robotically controlled lift gas into balloon filling process.

At subsequent process step 610, the container and dispersal subsystem can be steered as they are raised by balloon and elevation subsystem. This can be accomplished by a steering subsystem as detailed above and can also result in steering the elevation subsystem. Process step 610 can be automatically performed in some arrangements, such as by robotically controlled sensors, thrusters, steerable parachutes, and other steering components in a steering subsystem.

At a following process step 612, the container can be elevated to a raised location in the atmosphere. This can result in elevating the dispersal subsystem and elevation subsystem as well. The raised location can be above a ground level location, such as within the stratosphere, for example. Elevating can involve use of the balloon and elevation subsystem. Process step 612 can be automatically performed in some arrangements, such as by a robotically controlled container elevation process.

The next process step 614 can involve receiving the pressurized liquid into a dispersal subsystem. This can be done while the container and dispersal subsystem are at the raised location and can involve the use of a valve or pressure regulator from the container outlet to an inlet of the dispersal subsystem. Process step 614 can be automatically performed in some arrangements, such as by robotically controlling the start and flow of liquid from the container into the dispersal subsystem.

Process step 616 can involve regulating the pressurized liquid into a conversion chamber within the dispersal subsystem. This can be accomplished using an electronically controlled pressure regulator between the container and the conversion chamber, for example. Process step 616 can be automatically performed in some arrangements, such as by robotically controlling the pressure and flow out of the pressure regulator.

At subsequent process step 618, the pressurized liquid can be converted into a gas within the dispersal subsystem, which can take place within the conversion chamber. This can involve regulating the pressurized liquid into the conversion chamber, heating the pressurized liquid in the insulated chamber until it becomes a gas, and then regulating the gas out of the insulated chamber. Process step 618 can be automatically performed in some arrangements, such as by robotically controlling pressure regulators and a heater to deliver the liquid into the conversion chamber, heat the conversion chamber, and deliver gas out of the conversion chamber, as well as using pressure and temperature sensors to facilitate the process.

At a following process step 620, the gas can be dispersed into the atmosphere at the raised location. This can involve the use of a nozzle within the dispersal subsystem, for example. The gas can be configured to react with the atmosphere to result in the suspension of particulate matter within the atmosphere. The particulate matter can include sulfates, for example, although other forms of particulate matter are also possible. Process step 620 can be automatically performed in some arrangements, such as by robotically controlling the start and flow of gas out from the dispersal subsystem into the atmosphere.

At the next process step 622, the container can be lowered from the raised location in the atmosphere to a lowered location, such as proximate a boat or other ground based station. This can be accomplished by releasing some amount of the lift gas from the balloon, and can result in lowering the dispersal subsystem and elevation subsystem as well. Process step 622 can be automatically performed in some arrangements, such as by a robotically controlled container lowering process that releases lift gas in a controlled manner.

Process step 624 can involve docking the container or overall system at the boat or other ground based station. Such a ground based station can be configured for the docking of dispersal units such as the container and overall system here, as well as the refilling of pressurized fluid and lift gas in the dispersal units. Process step 624 can be automatically performed in some arrangements, such as by a robotically controlled dispersal unit to ground based station receival and docking process.

A subsequent decision step 626 can involve an inquiry as to whether a new cycle of delivering particulate matter into the atmosphere is desired for this particular dispersal unit or overall system configured to disperse particulate matter. If so, then the method can revert to process step 606 where some or all of process steps 606 through 624 can be repeated. If no further use cycle is desired, however, then method 600 can end or pause at end step 628.

For foregoing method 600, it will be appreciated that not all process steps are necessary, and that other process steps may be added in some arrangements. For example, steps 604 and/or 614 may be eliminated in some cases and/or steps regarding nozzle cleaning and system communications may be added in some embodiments. Furthermore, the order of steps may be altered in some cases, and some steps may be performed simultaneously. For example, steps 610 and 612 may be performed simultaneously in some cases. Although known process steps are provided for the various techniques in method 600, it will be appreciated that other suitable similar methods for using a container, an elevation subsystem, and/or a dispersal subsystem can also be used. Other variations and extrapolations of the disclosed methods will also be readily appreciated by those of skill in the art.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A self-contained system configured to disperse particulate matter, the system comprising:
a container configured to hold a pressurized liquid therein, wherein the container is further configured to dispense the pressurized liquid and be refilled with new pressurized liquid;
an elevation subsystem configured to elevate and lower the container between a ground level location and a raised location in the atmosphere above the ground level location, wherein the elevation subsystem includes:
a balloon configured to be filled with a lift gas, wherein the balloon is arranged for travel both in a lateral direction and in a vertical direction between the ground level and raised locations,
a tether coupled to the balloon and configured to control elevation of the balloon, wherein the tether is further configured to facilitate the filling and emptying of lift gas from the balloon,
a lift gas supply subsystem configured to supply lift gas into the balloon,
a steering subsystem configured to control a lateral direction of travel of the balloon, wherein the steering subsystem includes a steering ballast coupled to another system component, one or more steering sensors, and one or more steering thrusters configured to push the steering ballast in a desired lateral direction, and
a ballast coupled to the tether, wherein the ballast includes a cargo tank, is buoyant in water, and is configured to float in water when the balloon is sufficiently lowered; and
a dispersal subsystem coupled to the container, wherein the dispersal subsystem includes:
a first pressure regulator coupled to an outlet of the container, wherein the first pressure regulator is configured to receive the pressurized liquid from the container and provide the pressurized liquid at an outlet at a first controlled pressure and flow rate,
a conversion chamber coupled to the outlet of the first pressure regulator, wherein the conversion chamber is configured to facilitate transforming the pressurized liquid into a pressurized gas, and
a second pressure regulator coupled to an outlet of the conversion chamber, wherein the second pressure regulator is configured to receive the pressurized gas from the conversion chamber and provide the pressurized gas at an outlet at a second controlled pressure and flow rate to disperse the pressurized gas into the atmosphere at the raised location, and wherein the pressurized gas is configured to react with the atmosphere to result in the suspension of particulate matter within the atmosphere.

2. The system of claim 1, wherein the pressurized liquid is sulfur dioxide and the particulate matter includes sulfates.

3. The system of claim 1, wherein the raised location in the atmosphere is within the stratosphere or higher.

4. The system of claim 1, wherein the system is configured to be transferred between and operable with multiple separate ground based stations at different ground based locations.

5. The system of claim 1, wherein the container has a volume of about 2-4 cubic feet.

6. The system of claim 1, wherein the container is insulated and further including:
   a container heater configured to heat the container to a preferred temperature; and
   a container temperature sensor configured to monitor the temperature of the container and to facilitate operation of the container heater.

7. The system of claim 1, wherein the elevation subsystem further includes:
   a telemetry antenna coupled to the tether at a known location and configured to detect the elevation of the balloon.

8. The system of claim 7, wherein the lift gas supply subsystem includes a valve and a pump arranged to control the filling and emptying of lift gas to the balloon.

9. The system of claim 1, wherein the dispersal subsystem further includes:
   a nozzle coupled to the outlet of the second pressure regulator, wherein the nozzle is configured to disperse the pressurized gas into the atmosphere at the raised location at the second controlled pressure and flow rate.

10. The system of claim 9, wherein the dispersal subsystem further includes:
    a first pressure sensor at the first pressure regulator,
    first control circuitry configured to control the first controlled pressure and flow rate of the first pressure regulator based on output of the first pressure sensor,
    a second pressure sensor at the second pressure regulator, and
    second control circuitry configured to control the second controlled pressure and flow rate of the second pressure regulator based on output of the second pressure sensor.

11. The system of claim 9, wherein the dispersal subsystem further includes:
    a conversion chamber heater configured to heat the conversion chamber, and
    a conversion chamber temperature sensor configured to monitor the temperature of the conversion chamber and to facilitate operation of the conversion chamber heater.

12. The system of claim 9, wherein the dispersal subsystem further includes:
    a nozzle heater configured to heat the nozzle, and
    a nozzle temperature sensor configured to monitor the temperature of the nozzle and to facilitate operation of the nozzle heater.

13. The system of claim 9, wherein the dispersal subsystem further includes:
    an optical sensor located proximate the nozzle and configured to detect residual matter on the nozzle, and
    a cleaning element located proximate the nozzle and configured to clean the nozzle when the optical sensor detects residual matter on the nozzle.

14. A method of delivering particulate matter into the atmosphere using the self-contained system of claim 1, the method comprising:
    providing a pressurized liquid within a container, wherein the container is coupled to a dispersal subsystem having a first pressure regulator coupled to an outlet of the container, a conversion chamber coupled to the outlet of a first pressure regulator, and a second pressure regulator coupled to an outlet of the conversion chamber;
    elevating the container and dispersal subsystem to a raised location in the atmosphere above a ground level location using an elevation subsystem having
      a balloon configured to be filled with a lift gas, wherein the balloon is arranged for travel both in a lateral direction and in a vertical direction between the ground level and raised locations,
      a tether coupled to the balloon and configured to control elevation of the balloon, wherein the tether is further configured to facilitate the filling and emptying of lift gas from the balloon,
      a lift gas supply subsystem configured to supply lift gas into the balloon,
      a steering subsystem configured to control a lateral direction of travel of the balloon, wherein the steering subsystem includes a steering ballast coupled to another system component, one or more steering sensors, and one or more steering thrusters configured to push the steering ballast in a desired lateral direction, and
      a ballast coupled to the tether, wherein the ballast includes a cargo tank, is buoyant in water, and is configured to float in water when the balloon is sufficiently lowered;
    receiving the pressurized liquid from the container into the first pressure regulator of the dispersal subsystem while the container and dispersal subsystem are at the raised location;
    converting the pressurized liquid into a pressurized gas within the conversion chamber of the dispersal subsystem; and
    dispersing the pressurized gas from the second pressure regulator of the dispersal subsystem into the atmosphere at the raised location, wherein the pressurized gas is configured to react with the atmosphere to result in the suspension of particulate matter within the atmosphere.

15. The method of claim 14, wherein the pressurized liquid is sulfur dioxide and the particulate matter includes sulfates.

16. The method of claim 14, wherein elevating the container and dispersal subsystem involves coupling the container and dispersal subsystem to a balloon and filling the balloon with a lift gas.

17. The method of claim 14, wherein converting the pressurized liquid into a pressurized gas involves regulating the pressurized liquid into a conversion chamber, heating the pressurized liquid in the insulated chamber until it becomes a pressurized gas, and regulating the pressurized gas out of the insulated chamber.

18. The method of claim 14, further comprising the steps of:
    steering the container and dispersal subsystem while elevating to the raised location.

19. The method of claim 14, further comprising the steps of:
    lowering the container from the raised location to a lowered location;
    refilling the container with a new pressurized liquid; and
    repeating the steps of elevating, receiving, converting, and dispersing with the new pressurized liquid.

* * * * *